(12) United States Patent
Lin et al.

(10) Patent No.: US 7,518,599 B2
(45) Date of Patent: Apr. 14, 2009

(54) DISPLAY CONTROL DEVICE AND METHOD

(75) Inventors: Geng-Jen Lin, Tainan (TW);
Chuan-Ying Wang, Kaohsiung (TW);
Ching-Tung Wang, Hsinchu (TW);
Hung-Yang Kuo, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 450 days.

(21) Appl. No.: 10/639,249

(22) Filed: Aug. 12, 2003

(65) Prior Publication Data
US 2004/0066381 A1    Apr. 8, 2004

(30) Foreign Application Priority Data
Aug. 13, 2002    (TW) ................ 91118220 A (51) Int. Cl.
G09G 5/00        (2006.01)
G09G 5/39        (2006.01)
G06F 3/038       (2006.01)

(52) U.S. Cl. .............. 345/204; 345/211; 345/212; 345/213; 345/530; 345/534; 713/320; 713/321; 713/322; 713/323; 713/324

(58) Field of Classification Search ............... 345/204, 345/211–213, 530, 531, 534; 713/320–324
See application file for complete search history.

(56) References Cited

U.S. PATENT DOCUMENTS

| | | | |
|---|---|---|---|
| 5,444,458 A * | 8/1995 | Ishikawa | 345/98 |
| 5,956,006 A | 9/1999 | Sato | |
| 6,271,822 B1 | 8/2001 | Chiang | |
| 6,323,849 B1 * | 11/2001 | He et al. | 345/204 |
| 6,329,973 B1 * | 12/2001 | Akimoto et al. | 345/98 |
| 6,335,728 B1 * | 1/2002 | Kida et al. | 345/204 |
| 6,535,985 B1 * | 3/2003 | Oshima et al. | 713/323 |
| 6,771,241 B2 * | 8/2004 | Miyazawa et al. | 345/87 |
| 6,801,794 B2 * | 10/2004 | Bauer | 455/574 |
| 6,930,675 B2 * | 8/2005 | Ishiyama | 345/204 |

(Continued)

FOREIGN PATENT DOCUMENTS

CN    2054537 U    3/1990

(Continued)

*Primary Examiner*—Sumati Lefkowitz
*Assistant Examiner*—Alexander S. Beck
(74) *Attorney, Agent, or Firm*—Kirton & McConkie; Evan R. Witt (57) ABSTRACT

A display control device and a display control method for use in a portable electronic apparatus are disclosed. The portable electronic apparatus includes a main controller and a display panel. The display control device includes a digital data register in communication with the main controller for storing a digital data display signal received from the main controller, and a digital-to-analog converter in communication with the digital data register, converting the digital data display signal stored in the digital data register into an analog data display signal and outputting the analog data display signal to the display panel to be revealed. The main controller keeps on outputting refreshed digital data display signals in a normal mode, and suspends the output of any further digital data display signal in an idle mode. In the idle mode, the digital data register reiteratively outputs a last stored digital data display signal to the digital-to-analog converter.

11 Claims, 6 Drawing Sheets

U.S. PATENT DOCUMENTS

| | | | |
|---|---|---|---|
| 7,034,792 B2 * | 4/2006 | Tamura | 345/98 |
| 7,084,837 B2 * | 8/2006 | Sotoda et al. | 345/3.1 |
| 2002/0018058 A1 * | 2/2002 | Tamura | 345/204 |
| 2003/0190928 A1 * | 10/2003 | Mizumaki et al. | 455/550.1 |

FOREIGN PATENT DOCUMENTS

| | | |
|---|---|---|
| TW | 509205 | 8/1989 |

\* cited by examiner

DISPLAY CONTROL DEVICE AND METHOD

FIELD OF THE INVENTION

The present invention relates to a device for controlling a display, and more particularly to a device for controlling a display of a portable electronic apparatus. The present invention also relates to a method for controlling a display of a portable electronic apparatus.

BACKGROUND OF THE INVENTION

In most of portable electronic apparatus such as cellular phones or personal digital assistants (PDAs), planar displays are used for revealing various operational information. Please refer to FIG. 1 which is a circuit block diagram illustrating a conventional display control device for controlling a liquid crystal display of a portable electronic apparatus. The control device is electrically connected to a main controller 10 and a liquid crystal panel 13 of the portable electronic apparatus, and includes a gamma adjuster 11, a digital-to-analog converter (DAC) 12, and a timing controller 14. The main controller 10, e.g. a central processing unit (CPU) or a digital signal processor (DSP), outputs a digital data display signal and a control signal to the timing controller of the display control device. The digital data display signal is adjusted to comply with an optoelectronic response feature of the liquid crystal display by the gamma adjuster 11 and then converted into an analog data display signal by the DAC 12. Subsequently, the analog data is outputted to the liquid crystal panel 13. In the meantime, a set of panel display control signals required by the liquid crystal panel 13 for display is generated by the timing controller 14 in response to the control signal.

Figure 1:
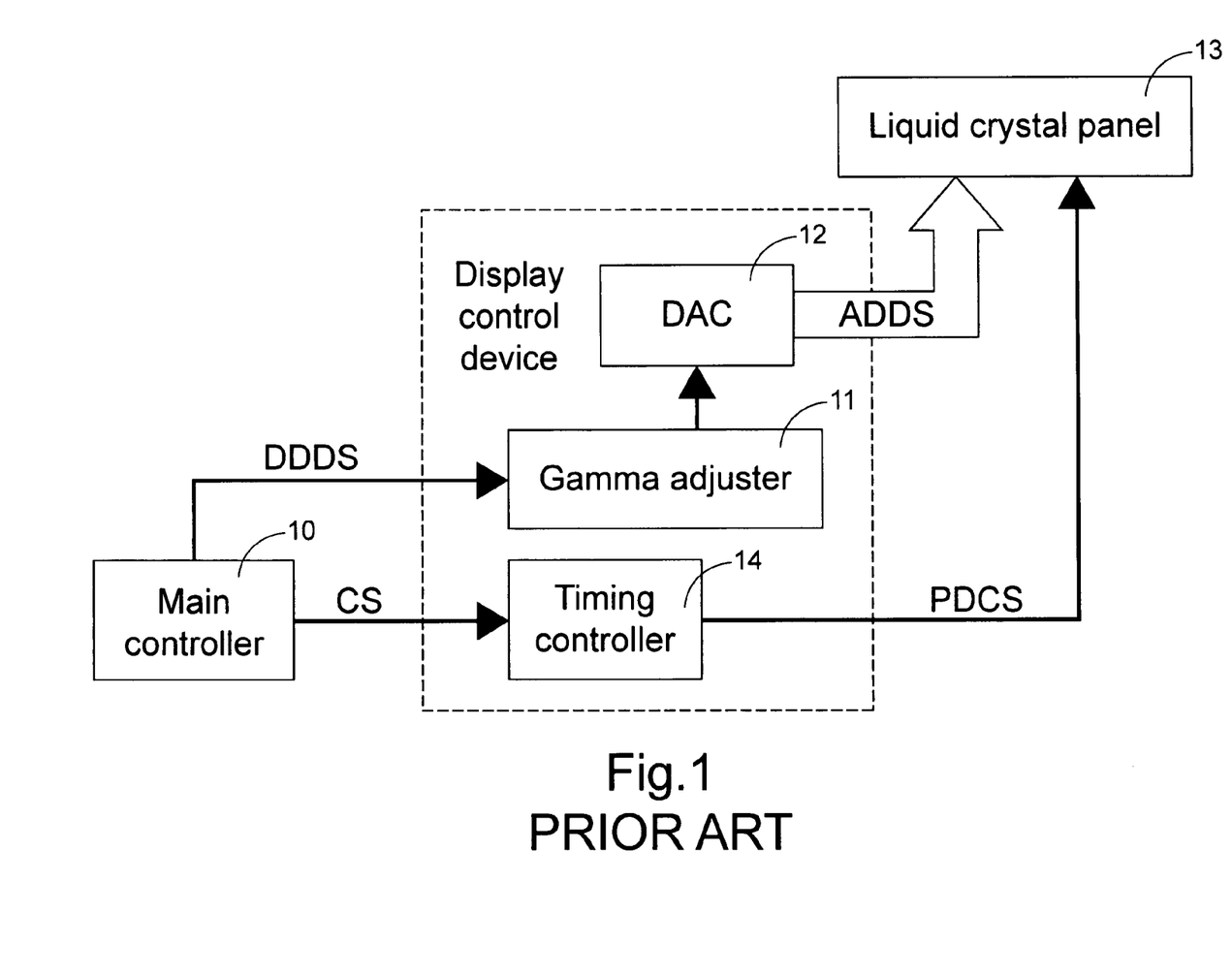
FIG. 1 is a circuit block diagram illustrating a conventional display control device for controlling a liquid crystal display of a portable electronic apparatus.

As is understood by those who are familiar with the display operation principle, the most popular way, so far, to refresh frames is to quickly refresh each pixel data of every scan line according to the analog data display signal in response to the panel display control signals. The main controller 10, however, needs to continuously output digital data display signals and assets control signals, resulting in large power consumption and thus shortened standby time.

Therefore, the purpose of the present invention is to develop a device and a method for controlling a display of a portable electronic apparatus to deal with the above situations encountered in the prior art.

SUMMARY OF THE INVENTION

An object of the present invention is to provide a device for controlling a display of a portable electronic apparatus to be operated under lowered power consumption.

Another object of the present invention is to provide a method for controlling a display of a portable electronic apparatus for reducing the power consumption and prolonging the standby time of the portable electronic apparatus.

A first aspect of the present invention relates to a display control device for use in an electronic apparatus including a main controller and a display panel. The display control device includes a digital data register in communication with the main controller for storing a digital data display signal received from the main controller; and a digital-to-analog converter in communication with the digital data register, converting the digital data display signal stored in the digital data register into an analog data display signal and outputting the analog data display signal to the display panel.

Preferably, the display control device further includes a timing controller in communication with the main controller and the display panel. The timing controller asserts a set of panel display control signals to the display panel in response to a control signal received from the main controller in a normal mode, and actively asserts the panel display control signals to the display panel when receiving no control signal from the main controller in an idle mode.

According to the present invention, when the main controller suspends the output of any digital data display signal, the digital data register reiteratively outputs a last stored digital data display signal to the digital-to-analog converter in the idle mode.

Preferably, the display control device further includes a gamma adjuster in communication with the main controller for performing a gamma-value compensation operation on the digital data display signal in order to comply with an optoelectronic response feature of the display panel.

For example, the digital data register is a static random access memory (SRAM).

The electronic apparatus, for example, is a personal digital assistant (PDA) including a central processing unit (CPU) and a liquid crystal display (LCD) panel. In another example, the electronic apparatus is a cellular phone including a digital signal processor (DSP) and a liquid crystal display (LCD) panel.

In one embodiment, the digital data display signal stored in the digital data register defines a display data to be shown on the full screen of the display panel.

In one embodiment, the digital data display signal stored in the digital data register defines a display data to be shown on a first portion of the display panel. The display control device, preferably, further includes a timing controller in communication with the main controller and the display panel for asserting a set of panel display control signals to the display panel, the set of panel display control signals including a display region control signal to control the digital data display signal stored in the digital data register to be revealed on the first portion, and another digital data display signal from the main controller to be revealed on a second portion of the display panel; and a multiplexer in communication with the digital data register, the main controller, the timing controller and the digital-to-analog converter, the multiplexer selecting one of the digital data display signal stored in the digital data register and the another digital data display signal from the main controller to be outputted to the digital-to-analog converter in response to a selection signal included in the set of panel display control signals. More preferably, the display control device further includes a gamma adjuster in communication with the main controller for performing gamma-value compensation operations on the digital data display signal to be revealed on the first portion and the another digital display signal to be revealed on the second portion in order to comply with an optoelectronic response feature of the display panel.

A second aspect of a display control device according to the present invention includes a digital-to-analog converter in communication with the main controller and the display panel for converting the digital data display signal into an analog data display signal and outputting the analog data display signal to the display panel to be displayed; and a timing controller in communication with the main controller and the display panel, asserting a set of panel display control signals to the display panel in response to a control signal received from the main controller, wherein the set of panel display control signals includes a display region control signal for defining which pixels in the display panel are to be activated for displaying the analog display signal.

A third aspect of the present invention relates to a display control method for use in an electronic apparatus including a main controller and a display panel. The display control method comprising steps of: successively receiving and refreshingly storing first digital data display signals from the main controller; reiteratively converting a last stored one of the first digital data display signals into an analog data display signal and outputting the analog data display signal to the display panel to be revealed in response to a first display control signal.

Preferably, the display control method further includes a step of sequentially converting the first digital data display signals into first analog data display signals and outputting the first analog data display signals to the display panel to be revealed in response to a first display control signal.

In one embodiment, the second display control signal is asserted in response to a control signal from the main controller in a normal mode. The second display control signal is asserted when there is no control signal received from the main controller in an idle mode. The main controller suspends the output of any first digital data display signal in the idle mode.

Preferably, the display control method further includes a step of performing a gamma-value compensation operation on the first digital data display signals in order to comply with an optoelectronic response feature of the display panel.

In one embodiment, the first digital data display signals define respective display data to be shown on a first portion of the display panel. The display control method further includes a step of showing display data defined by second digital data display signals from the main controller on a second portion of the display panel. The display data shown on the second portion is controlled by a display region control signal asserted to the display panel.

A fourth aspect of a display control method according to the present invention includes steps of: converting digital data display signals from the main controller into analog data display signals; asserting a set of panel display control signals to the display panel in response to a control signal from the main controller; and refreshing partial pixels in the display panel by the analog data display signals in response to a display region control signal included in the set of panel display control signals.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of embodiments of this invention are presented herein for purpose of illustration and description only; it is not intended to be exhaustive or to be limited to the precise form disclosed.

Figure 2:
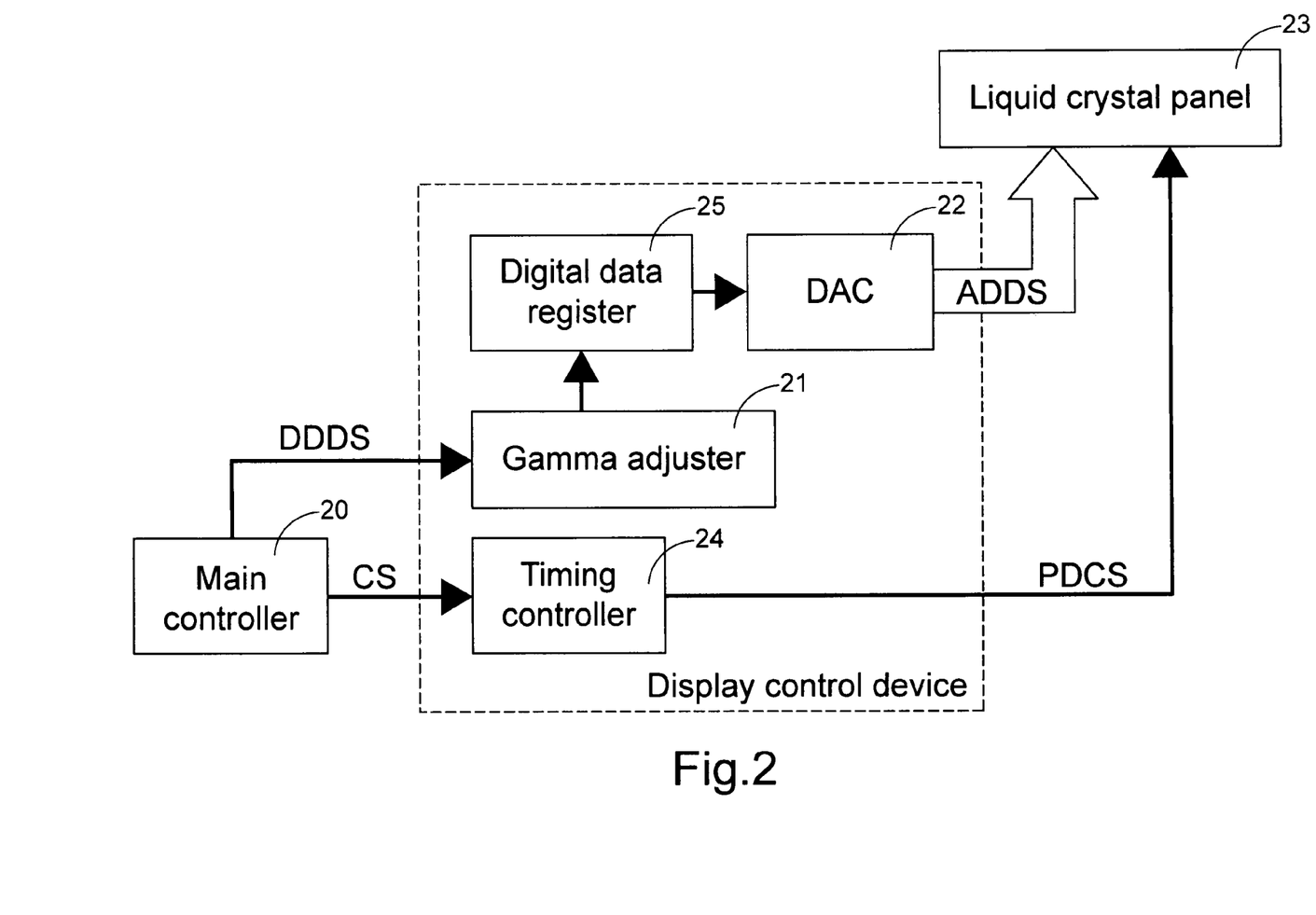
FIG. 2 is a circuit block diagram illustrating an embodiment of a display control device for controlling a liquid crystal display of a portable electronic apparatus according to the present invention.

Please refer to FIG. 2 which is a circuit block diagram illustrating an embodiment of a display control device for controlling a liquid crystal display (LCD) of a portable electronic apparatus according to the present invention. The display control device is used with a main controller 20 and a liquid crystal panel 23, and includes a gamma adjuster 21, a digital-to-analog converter (DAC) 22, a timing controller 24 and a digital data register 25. The implementation of the main controller depends on the type of the electronic apparatus. For example, when the portable electronic apparatus is a personal digital assistant (PDA), the main controller 20 is a central processing unit (CPU). When the portable electronic apparatus is a cellular phone, the main controller 20 is a digital signal processor (DSP). The digital data display signals are adjusted by the gamma adjuster 21 to comply with an optoelectronic response feature of the liquid crystal panel 23, refreshingly stored in the digital data register 25, converted into analog data display signals by the DAC 22, and then outputted to the liquid crystal panel 23 to be revealed. The timing controller 24 generates a set of panel display control signals required by the liquid crystal panel 23 in response to the control signal. The digital data register 25, for example, can be a static random access memory (SRAM).

The term "refreshingly stored" used herein means a newcoming digital display signal will replace for the preceding digital data display signal to be stored in the digital data register 45.

In a normal mode, the main controller 20 keeps on outputting digital data display signals and asserting control signals even if the displayed data has been remaining unchanged, and thus consumes much power. Therefore, when the portable electronic apparatus is not in use for a certain period of time, i.e. the entire frame remains unchanged for a certain period of time, an idle mode is entered for saving power consumption. In the idle mode, the main controller 20 suspends the assertion of any control signal and the output of any further digital data display signal. Under this circumstance, the timing controller 24 generates the set of panel display control signals to the display panel 23 actively. In response to the panel display control signals, the digital data display signal stored in the digital data register 25 is reiteratively shown on the liquid crystal panel 23. Thus, the desired frame can still be shown even when the main controller 20 suspends the assertion of any control signal and the output of any further digital data display signal.

Figure 3A:
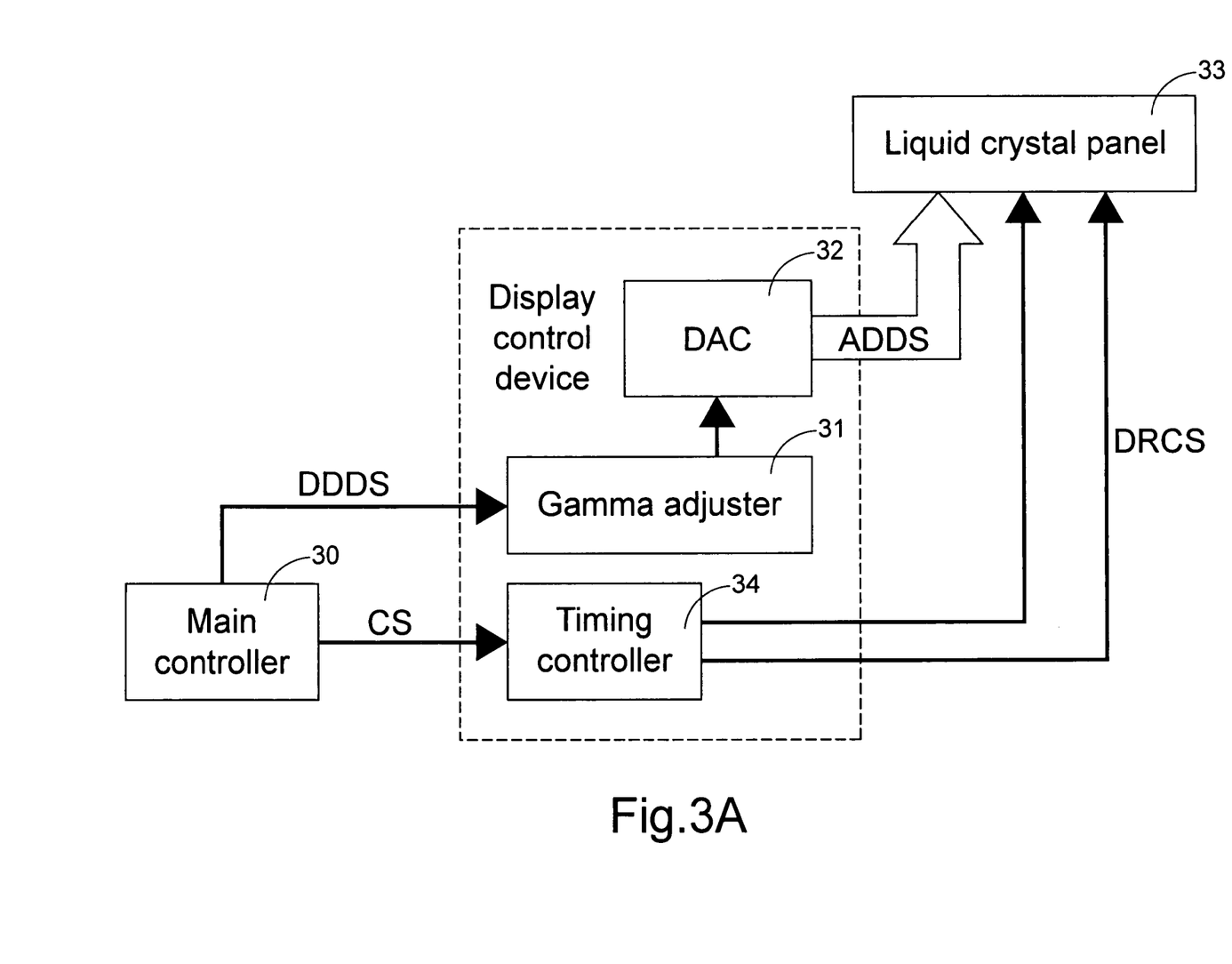
FIG. 3A is a circuit block diagram illustrating another embodiment of a display control device for controlling a liquid crystal display of a portable electronic apparatus according to the present invention.

Please refer to FIG. 3A which is a circuit block diagram illustrating another embodiment of a display control device for controlling a liquid crystal display of a portable electronic apparatus according to the present invention. In this embodiment, only the pixels in the region required to be refreshed are activated, which is so-called as a partial mode. The display control device is used with a main controller 30 and a liquid crystal panel 33, and includes a gamma adjuster 31, a digital-to-analog converter (DAC) 32, and a timing controller 34.

Figure 3B:
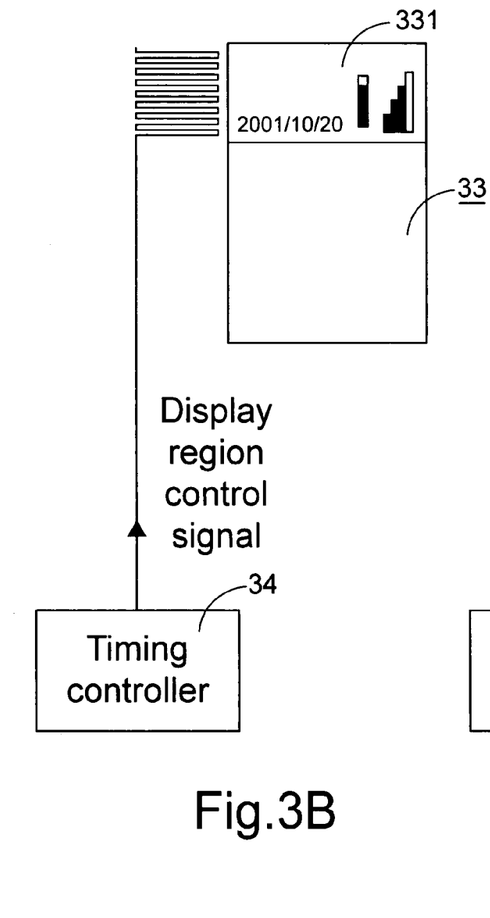
FIGS. 3B-3D are schematic diagrams illustrating display examples under the control of the display control device in FIG. 3A.
Figure 3C:
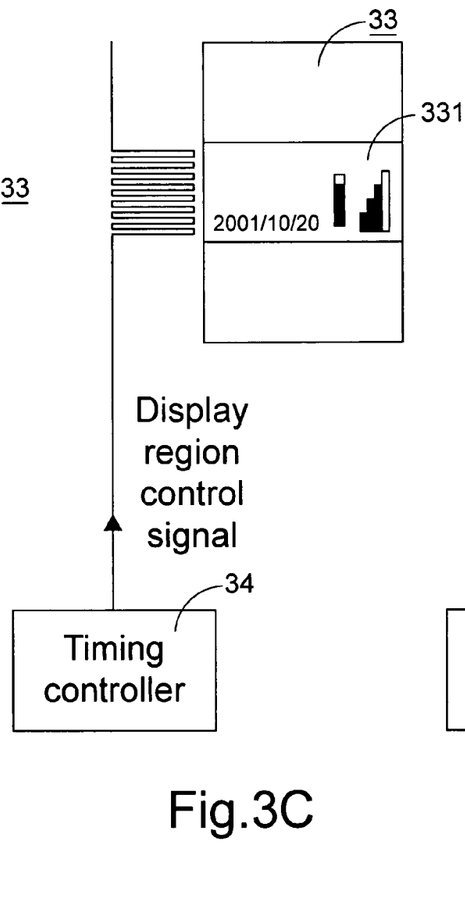
Figure 3D:
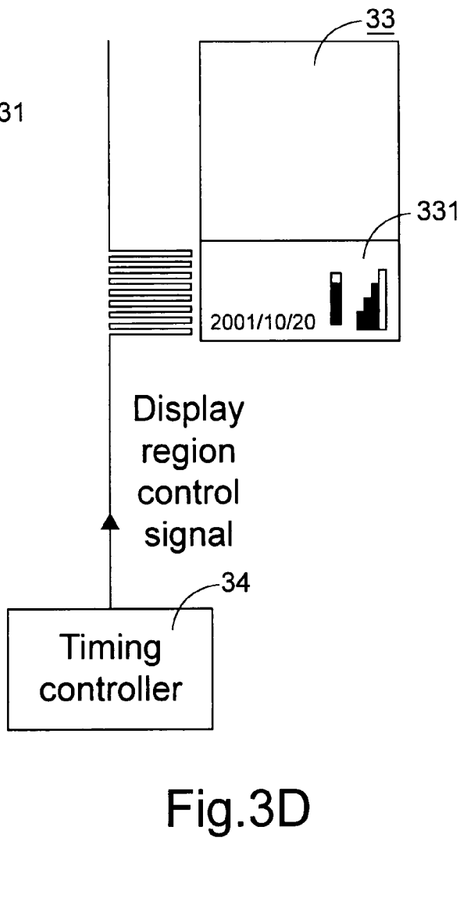

When the portable electronic apparatus is not in use for a certain period of time, the power-saving partial mode is entered for saving power consumption. In the partial mode, the data input to the liquid crystal panel 33 is disabled except for the region required to be refreshed. Therefore, the main controller 30 suspends the assertion of any control signal (CS) and the output of any further digital data display signal (DDDS) in a first time period, and recovers to provide the digital data display signals and control signals in a second time period. In the second time period, the timing controller 34 asserts a display region control signal (DRCS) to the liquid crystal panel 33. The liquid crystal panel 33 displays the display signals outputted from the main controller 30 and processed by the gamma adjuster 31 and digital-to-analog converter (DAC) 32 only by partial pixels in response to the display region control signal. For example, in a case that only the data in the upper region of the display panel 33 is required to be refreshed, as shown in FIG. 3B, the displayed and refreshed region 331 is limited to the upper region by disabling the data input associated with the other portion of the liquid crystal panel 33. Likewise, the displayed and refreshed region 331 can also be the middle or lower region of the liquid crystal panel 33, as shown in FIGS. 3C and 3D, respectively, in response to respective display region control signals.

Figure 4A:
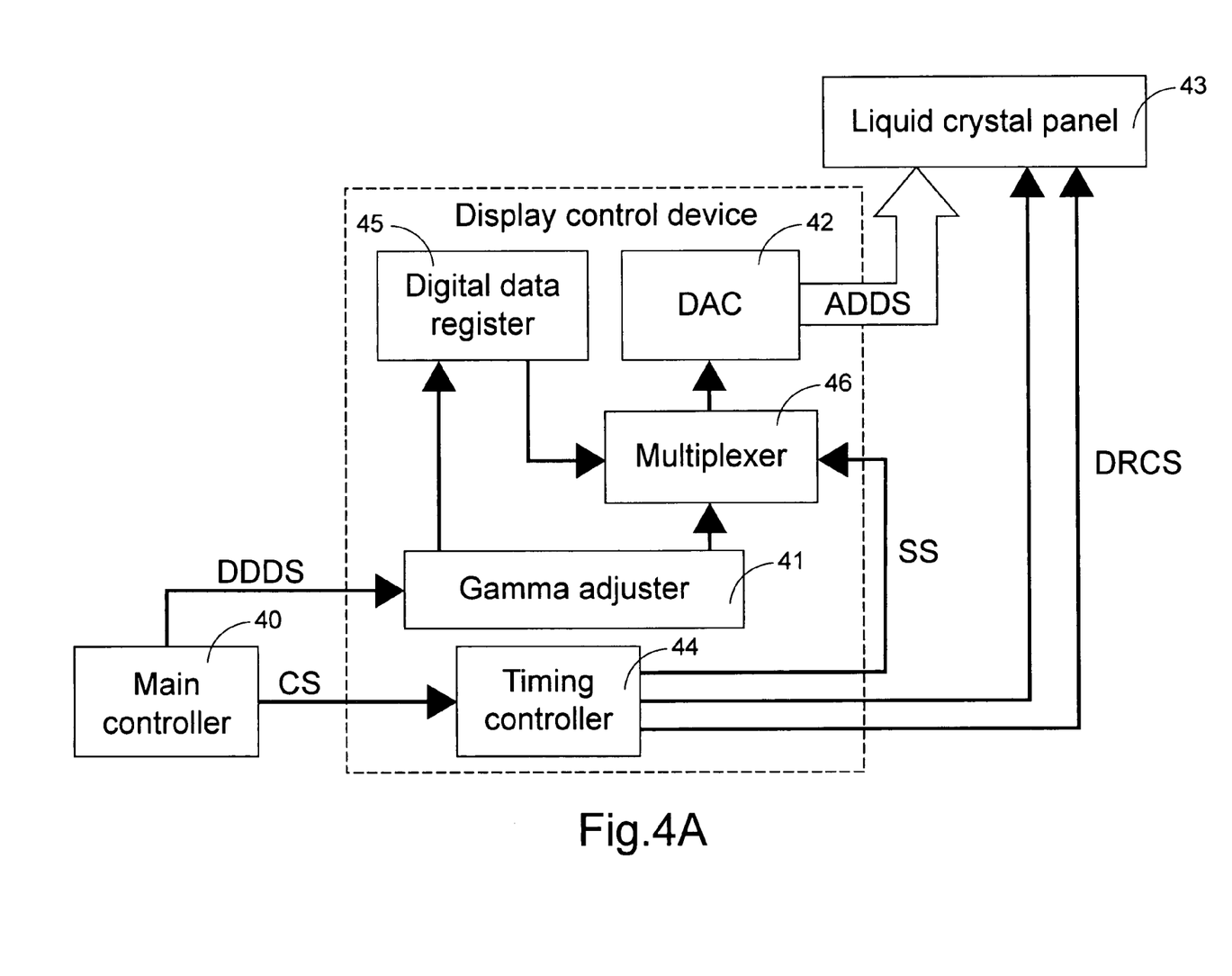
FIG. 4A is a circuit block diagram illustrating a further embodiment of a display control device for controlling a liquid crystal display of a portable electronic apparatus according to the present invention.
Figure 4B:
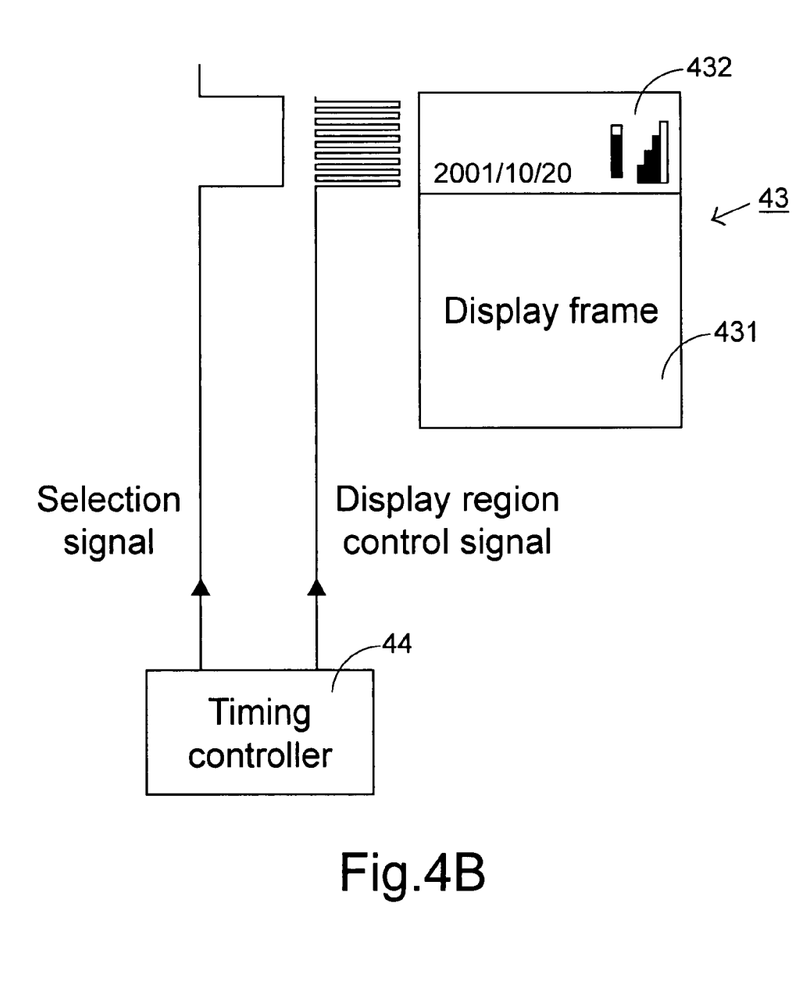
FIG. 4B is a schematic diagram illustrating a display example under the control of the display control device in FIG. 4A.

Please refer to FIG. 4A which is a circuit block diagram illustrating a further embodiment of a display control device for controlling a liquid crystal display of a portable electronic apparatus according to the present invention. In this embodiment, the refreshing operation is performed only for the region of the display panel requiring refreshed data, and the other region of the display panel remains displaying but not refreshing data, which is so called as a hybrid mode. The display control device is used with a main controller 40 and a liquid crystal panel 43, and includes a gamma adjuster 41, a digital-to-analog converter (DAC) 42, a timing controller 44, a digital data register 45 and a multiplexer 46. In a normal mode, the digital data display signal (DDDS) from the main controller 40 is processed by the gamma adjuster 41, then transmitted to the DAC 42 via the multiplexer 46 to be converted into an analog data display signal (ADDS), and then outputted to the liquid crystal panel 43 under the control of a set of display control signals from the timing controller 44. Meanwhile, the digital data display signal is also transmitted to the digital data register 45 to be stored. The new-coming digital data display signal, if any, will replace for the preceding digital data display signal to be refreshingly stored in the digital data register 45. When the portable electronic apparatus is switched from the normal mode to the hybrid mode, the timing controller 44 generates a display region control signal and a selection signal for controlling the liquid crystal panel 43 and the multiplexer 46, respectively. The main controller 40 suspends the output of the digital data display signal and the assertion of the control signal in a first time period for reducing power consumption. Meanwhile, the multiplexer 26 selects the digital data display signal pre-stored in the digital data register 45 to the DAC 42 in response to the selection signal. The digital data display signal is converted into an analog data display signal by the DAC 42, and displayed on a first portion 431 of the liquid crystal panel 43, as shown in FIG. 4B. On the other hand, in a second time period, the main controller 40 recovers to output a new digital data display signal and asserts the control signal. Meanwhile, the multiplexer 26 selects the new-coming digital data display signal adjusted by the gamma adjuster 41 to be outputted to the DAC 42 in response to the selection signal. The digital data display signal is converted into an analog data display signal, and displayed on a second portion 432 of the liquid crystal panel 43 in response to the display region control signal, as shown in FIG. 4B. In other words, in the power-saving hybrid mode, while the main controller 40 keeps on providing new digital data display signals and control signals to refresh the display data in the second portion 432 of the liquid crystal panel 43 in the second time period, the main controller 40 need not provide any new digital data display signals and control signals in the second time period because the display data to be revealed in the first portion 431 comes from the digital data register 45.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display control device for use in an electronic apparatus, said electronic apparatus including a main controller and a display panel, and said display control device comprising:

a digital data register in communication with said main controller for refreshingly storing a digital data display signal received from said main controller in a normal mode, and reiteratively outputs a last stored digital data display signal in an idle mode, wherein said digital data display signal further defines a display data to be shown on a first portion of said display panel;

a digital-to-analog converter in communication with said digital data register, converting said digital data display signal stored in said digital data register into an analog data display signal and outputting said analog data display signal to said display panel to be revealed;

a timing controller in communication with said main controller and said display panel, asserting a set of panel display control signals to said display panel in response to a control signal separate from the digital data display signal and received from said main controller in said normal mode, and actively asserting said set of panel display control signals to said display panel when receiving no control signal from said main controller in said idle mode, wherein said set of panel display control signals includes a display region control signal to control said digital data display signal stored in said digital data register to be revealed on said first portion, and another digital data display signal from said main controller to be revealed on a second portion of said display panel; and a multiplexer in communication with said digital data register, said main controller, said timing controller and said digital-to-analog converter, said multiplexer selecting one of said digital data display signal stored in said digital data register and said another digital data display signal from said main controller to be outputted to said digital-to-analog converter in response to a selection signal included in said set of panel display control signals.

2. The display control device according to claim 1 wherein said main controller suspends the output of any digital data display signal in said idle mode.

3. The display control device according to claim 1 further comprising a gamma adjuster in communication with said main controller for performing a gamma-value compensation operation on said digital data display signal in order to comply with an optoelectronic response feature of said display panel.

4. The display control device according to claim 1 wherein said digital data register is a static random access memory (SRAM).

5. The display control device according to claim 1 wherein said electronic apparatus is a personal digital assistant (PDA) including a central processing unit (CPU) and a liquid crystal display (LCD) panel.

6. The display control device according to claim 1 wherein said electronic apparatus is a cellular phone including a digital signal processor (DSP) and a liquid crystal display (LCD) panel.

7. The display control device according to claim 1 further comprising a gamma adjuster in communication with said main controller for performing gamma-value compensation operations on said digital data display signal to be revealed on said first portion and said another digital display signal to be revealed on said second portion in order to comply with an optoelectronic response feature of said display panel.

8. A display control method for use in an electronic apparatus, said electronic apparatus including a main controller and a display panel, and said display control method comprising steps of:

successively receiving and refreshingly storing first digital data display signals from said main controller, wherein said first digital data display signals define display data to be shown on a first portion of said display panel;

sequentially converting said first digital data display signals into first analog data display signals and outputting said first analog data display signals to said display panel to be revealed in a normal mode in response to a first display control signal asserted in response to a control signal separate from the first digital data display signals and received from said main controller;

reiteratively converting a last stored one of said first digital data display signals into an analog data display signal and outputting said analog data display signal to said display panel to be revealed in an idle mode in response to said first display control signal when receiving no control signal from said main controller; and a multiplexer selecting one of said stored first digital data display signal and a second digital data display signal from said main controller to be converted into said analog data display signal in response to a selection signal wherein said second digital data display signals define display data to be shown on a second portion of said display panel.

9. The display control method according to claim 8 wherein said main controller suspends the output of any first digital data display signal in said idle mode.

10. The display control method according to claim 8 further comprising a step of performing a gamma-value compensation operation on said first digital data display signals in order to comply with an optoelectronic response feature of said display panel.

11. The display control method according to claim 8 wherein said display data shown on said second portion is controlled by a display region control signal asserted to said display panel.

* * * * *